(12) United States Patent
Steinmetz et al.

(10) Patent No.: US 11,704,029 B2
(45) Date of Patent: Jul. 18, 2023

(54) ELASTIC PERSISTENT MEMORY REGIONS

(71) Applicant: Micron Technology, Inc., Boise, ID (US)

(72) Inventors: Joseph H. Steinmetz, Loomis, CA (US); Luca Bert, San Jose, CA (US); William Akin, Morgan Hill, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/232,971

(22) Filed: Apr. 16, 2021

(65) Prior Publication Data

US 2022/0334740 A1  Oct. 20, 2022

(51) Int. Cl.
*G06F 3/06* (2006.01)
*G06F 12/0808* (2016.01)

(52) U.S. Cl.
CPC .......... *G06F 3/0631* (2013.01); *G06F 3/0604* (2013.01); *G06F 3/068* (2013.01); *G06F 3/0644* (2013.01); *G06F 12/0808* (2013.01); *G06F 2212/1044* (2013.01)

(58) Field of Classification Search
CPC ...... G06F 3/0604; G06F 3/061; G06F 3/0644; G06F 3/068; G06F 2212/1044; G06F 12/0808
USPC ......................................................... 711/103
See application file for complete search history.

(56) References Cited

U.S. PATENT DOCUMENTS

| | | |
|---|---|---|
| 9,747,174 B2 | 8/2017 | Fitzgerald et al. |
| 2016/0170645 A1* | 6/2016 | Kumar ............... G06F 12/0842 711/170 |
| 2017/0185316 A1* | 6/2017 | Nieuwejaar .......... G06F 3/0611 |
| 2020/0004445 A1 | 1/2020 | Benisty |
| 2020/0042177 A1 | 2/2020 | Benisty |
| 2020/0097367 A1 | 3/2020 | Kim et al. |
| 2020/0201787 A1 | 6/2020 | Shanbhogue et al. |
| 2020/0401530 A1* | 12/2020 | Abulila ................. G06F 12/124 |

OTHER PUBLICATIONS

PCT Notification of Transmittal of the International Search Report and the Written Opinion of the International Searching Authority for PCT Application No. PCT/US2022/025098, dated Aug. 1, 2022, 11 pages.

* cited by examiner

*Primary Examiner* — Hua J Song
(74) *Attorney, Agent, or Firm* — Lowenstein Sandler LLP

(57) ABSTRACT

A system includes a first memory device having a region allocated as a first persistent memory region (PMR) having a first set of pages, a second memory device comprising a non-volatile memory device having a region allocated as a second PMR region having a second set of pages, and at least one processing device, operatively coupled to the first memory device and the second memory device, to implement a PMR mechanism to cause the second PMR region to be accessible through the first PMR region.

18 Claims, 7 Drawing Sheets

ELASTIC PERSISTENT MEMORY REGIONS

TECHNICAL FIELD

Embodiments of the disclosure relate generally to memory sub-systems, and more specifically, relate to elastic persistent memory regions (PMRs).

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
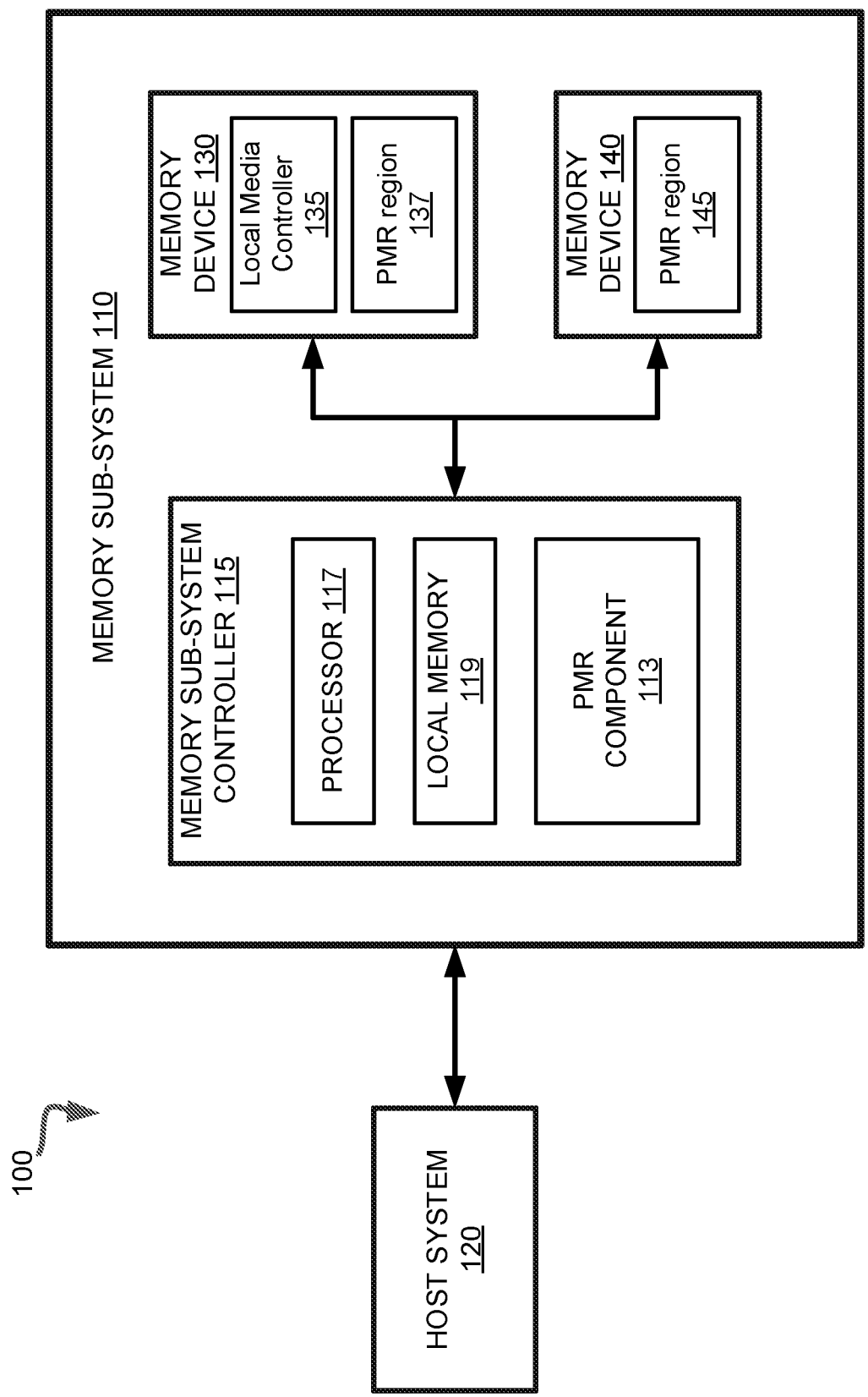
FIG. 1 illustrates an example computing system that includes a memory sub-system in accordance with some embodiments of the present disclosure.

Aspects of the present disclosure are directed to enabling devices with elastic persistent memory regions (PMRs). A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

It has become more important to have regions of system-exposed byte addressable memory alongside the block storage element for a variety of implementations or use cases that can make use of transaction oriented persistent memory, and modern application reliance on transaction consistency has grown significantly. Exemplary implementations that can make use of transaction oriented persistent memory include, but are not limited to, write journaling, logs for software RAID and erasure coding systems, commit logs for database, metadata for compressed volumes, staging for de-duplication, compression, etc., state transfers in failover environments, error/warning logging (e.g., device breadcrumbs), compression metadata tables for inline block compression, and cooperative storage domain metadata (e.g., virtual drive groups).

One solution being implemented is the use of non-volatile in-line memory modules (NVDIMMs). However, NVDIMM implementations can be expensive and have their own limitations. For example, NVDIMM may not be practical going forward as the technology may not easily apply to modern system architectures and because its protection mechanism between nodes cannot scale accordingly.

A memory sub-system, such as a solid-state drive (SSD), can be accessed by a logical-device interface attached via a bus. One example of such a logical-device interface for accessing a memory device is Non-Volatile Memory Express (NVMe). A host system ("host") can access the memory sub-system via, e.g., a Peripheral Component Interconnect Express (PCIe) bus, and the access to the memory device(s) of the memory sub-system can be referred to herein as PCIe NVMe. More specifically, the memory sub-system (e.g., SSD) can include a storage element and a persistent memory region (PMR). For example, the storage element can include a block storage element. A PMR corresponds an area of readable persistent memory. As one example, the PMR can be implemented as a power protected region on a volatile memory device of the memory sub-system. Here, the volatile memory device can include a Dynamic Random-Access Memory (DRAM) device. More specifically, the DRAM device can be a Double Data Rate Synchronous Dynamic Random-Access Memory (DDR) device. As another example, the PMR can be implemented on a native non-volatile memory device, such as magnetic RAM (MRAM) or other similar non-volatile memory device. More specifically, the PMR can be a byte-addressable memory region accessible through a base address register (BAR). In some embodiments, the memory sub-system is an NVMe SSD including a PMR, with such a device being referred to as an NVMe SSD device with PMR. The memory sub-system can implement any suitable interface standard in accordance with the embodiments described herein. In some embodiments, the interface standard is PCIe. In some embodiments, the interface standard is compute express link (CXL).

Current memory technology, form factor and power considerations restrict the amount of memory that can be exposed to a host system. Due to the cost and scarcity of resources used to implement a PMR as a power protected region on a volatile memory device, only a small amount of memory can be dedicated to PMR using conventional approaches. For example, a DDR device can limit the size of a PMR to 10's of MBs, whereas some applications involving PMR can make use of regions that are 10's of GBs in size. Accordingly, PMR memory sizing on volatile memory devices can be too small for applications involving PMR.

Aspects of the present disclosure address the above and other deficiencies by providing a memory sub-system that enables elastic PMRs. More specifically, aspects of the present disclosure can expose a large memory region to a host system in a transparent way to implement a PMR without requiring the same physical space or footprint on the memory device hosting the PMR. More specifically, a large memory region can be created on a non-volatile memory device (e.g., NAND) that is accessible through a small PMR region. In some embodiments, the PMR is a power protected region on a volatile memory device. For example, the volatile memory device can be a DRAM device. More specifically, the DRAM device can be a DDR device. For example, the embodiments described herein can scale to 10's of GBs with a PMR region size on a DDR device of only 10's of MBs. The PMR can be exposed by any suitable interface standard in accordance with the embodiments described herein (e.g., PCIe and/or CXL).

For example, a system can include a first PMR region allocated to a volatile memory device (e.g., DDR). The first PMR region can include a suitable number of pages having a given size. The size of the first PMR region can be much smaller than the total size of the volatile memory device. For example, if the size of the volatile memory device is 32 GB, then size of the first PMR region can be 32 MB, and if the size of each page is 1 MB, then the maximum number of pages is 32. Persistence of the first PMR region on the volatile memory device can be achieved by employing power protection to save write data and state information on the memory sub-system after a power loss event. For example, the power protection can involve the use of a capacitance energy well.

The system can further include a second PMR region allocated to a non-volatile memory device (e.g., NAND). The size of the second PMR region can be much smaller than the total size of the non-volatile memory device. For example, if the size of the non-volatile memory device is 42 TB, then the size of the second PMR region can be 10 GB.

The system can further include a set of key registers internal to the memory sub-system controller. More specifically, the set of key registers can be used to manage when a memory page ("page") of the PMR can be evicted (i.e., moved to non-volatile memory (e.g., NAND)) or cached (i.e., moved into volatile memory (e.g., DDR)). The set of key registers can be used by a PMR component including firmware and/or hardware to implement caching logic to optimize access latency and hit rate to pages based on any suitable metric. One such data metric is "data temperature," which refers to whether data is "hot" or "cold" with respect to frequency of data access. Any suitable caching logic can be implemented to determine which page(s) to swap out when a new page needs to be allocated in accordance with the embodiments described herein. Examples of suitable caching methods include, but are not limited to, first-in-first-out (FIFO), last-in-first-out (LIFO), least recently used (LRU), least frequently used (LFU), time aware LRU (TLRU), round robin (RR), etc. If access to a location in the PMR ("PMR access location") is page-resident ("hit"), then it can be possible to avoid firmware/hardware invocation, and if the PMR access location is not page-resident ("miss"), then firmware/hardware can be invoked to manage the eviction process. To determine whether or not the PMR access location is a hit or miss, the system can further include a cache lookup component maintaining a cache lookup data structure (e.g., cache lookup table). The cache lookup component can generate metadata used to measure frequency of access (e.g., data temperature). For example, the cache lookup component can include a content addressable memory (CAM) device. The system can be further configured to manage shutdown processes and/or startup processes in response to detecting shutdown events and/or startup events.

Advantages of the present disclosure include, but are not limited to, larger exposed memory regions while using the same physical memory footprint, host system transparency with respect to managing exposed memory versus actual memory, and low cost persistence solutions.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a persistent memory region (PMR) component 113. In some embodiments, the memory sub-system controller 115 includes at least a portion of the PMR component 113. In some embodiments, the PMR component 113 is part of the host system 110, an application, or an operating system. In other embodiments, local media controller 135 includes at least a portion of PMR component 113 and is configured to perform the functionality described herein.

The PMR component 113 can be used to enable the memory sub-system 110 (e.g., NVMe SSD device) with an elastic PMR. The PMR component 113 can provide for a mechanism that can expose a large memory region to the host system 120 in a transparent way to implement a PMR region 145 on the memory device 140. For example, the memory device 140 can include a volatile memory device (e.g., DRAM or DDR) and the PMR region 145 can be implemented as a power protected region on the volatile memory device. As another example, the memory device 140 can include a non-volatile memory device (e.g., MRAM) and the PMR region 145 can be implemented on the non-volatile memory device. Moreover, a PMR region 137 can be implemented on the memory device 130. For example, the memory device 130 can include a non-volatile memory device (e.g., NAND). The memory sub-system controller 115 can maintain a set of key registers (e.g., within the local memory 119). More specifically, the set of key registers can be used to manage when a memory page ("page") can be evicted (i.e., moved to non-volatile memory (e.g., NAND)) or cached (i.e., moved into volatile memory (e.g., DDR)). The set of key registers can be used to implement a caching mechanism to optimize access latency and hit rate to pages based on any suitable metric. One such data metric is "data temperature," which refers to whether data is "hot" or "cold" with respect to frequency of data access. In some embodiments, the memory sub-system 110 can be a PCIe device supporting PCIe protocols. In some embodiments, the memory sub-system 110 can be a CXL device supporting CXL protocols. The PMR component 113 can be used to implement any suitable device to perform any suitable application(s). Further details with regards to the operations of the PMR component 113 are described below.

Figure 2:
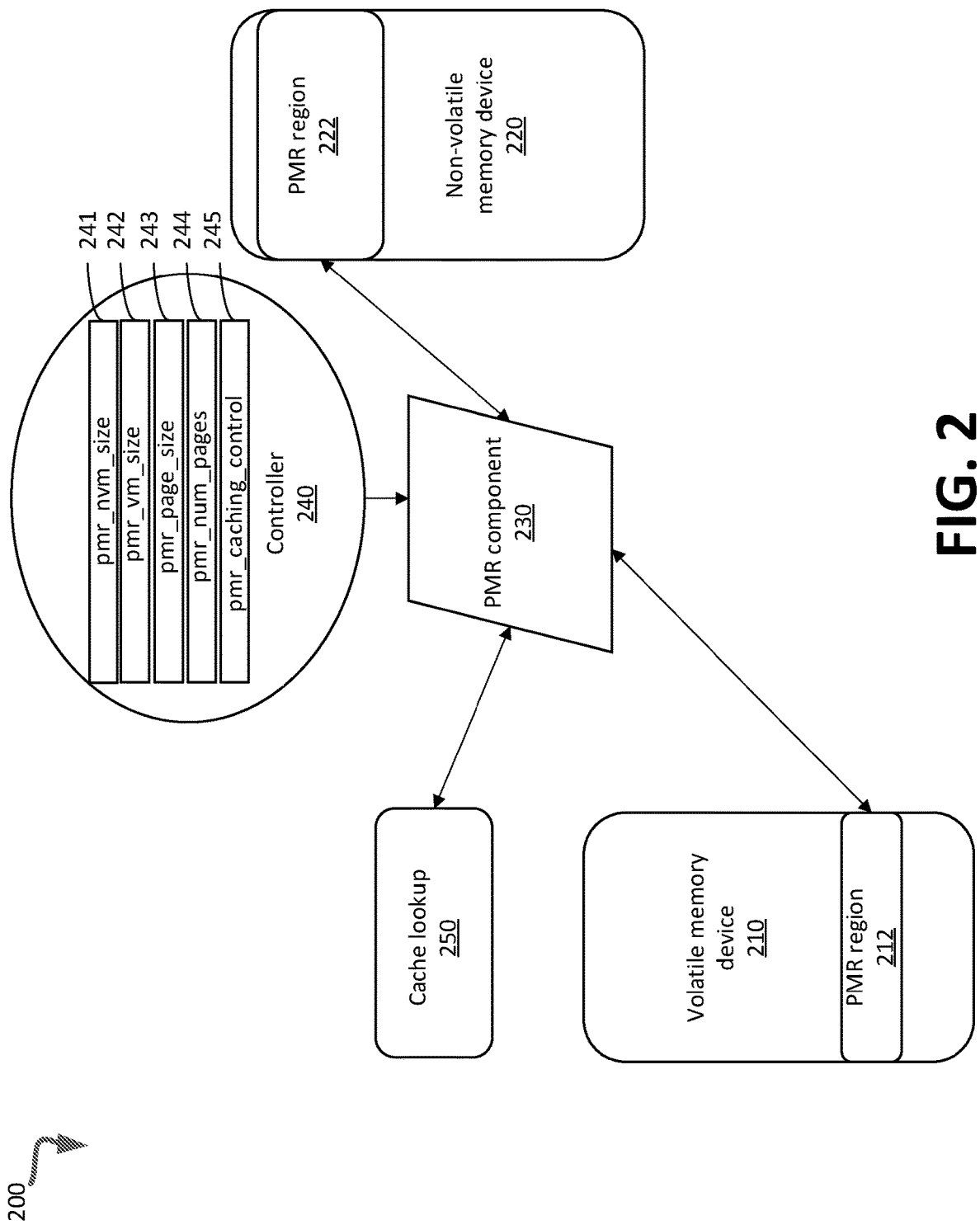
FIG. 2 is a block diagram of an example system to enable an elastic persistent memory region (PMR) in accordance with some embodiments of the present disclosure.

FIG. 2 is a block diagram of an example system 200 to enable an elastic persistent memory region (PMR). For example, the system 200 can include an SSD device. In some embodiments, the system 200 includes a PCIe SSD device. In some embodiments, the system 200 includes a CXL SSD device.

As shown, the system 200 includes a volatile memory device 210 (e.g., memory device 140 of FIG. 1). For example, the volatile memory device can include a DRAM device or a DDR device. A region of the volatile memory device 210 is allocated to a PMR, referred to as PMR region 212 (e.g., PMR region 145 of FIG. 1). To address a power loss event, the PMR region 212 can be implemented as a power protected region on the volatile memory device 210. More specifically, persistence of the PMR region 212 on a volatile memory device can be achieved by employing power protection to save write data and state information on the memory sub-system after a power loss event. For example, the power protection can involve the use of a capacitance energy well. In alternative embodiments, the PMR region 212 can be allocated to a non-volatile memory device. In such embodiments, power loss protection may not be needed.

The PMR region 212 has a small size relative to the volatile memory device 210. For example, if the volatile memory device 210 includes a DDR having a size of 32 gigabytes (GB), then the PMR region 212 can have a size of 32 megabytes (MB). The PMR region 212 can maintain a number of pages each having a corresponding page size. Further details regarding the pages of the PMR region 212 will now be described below with reference to FIG. 3.

Figure 3:
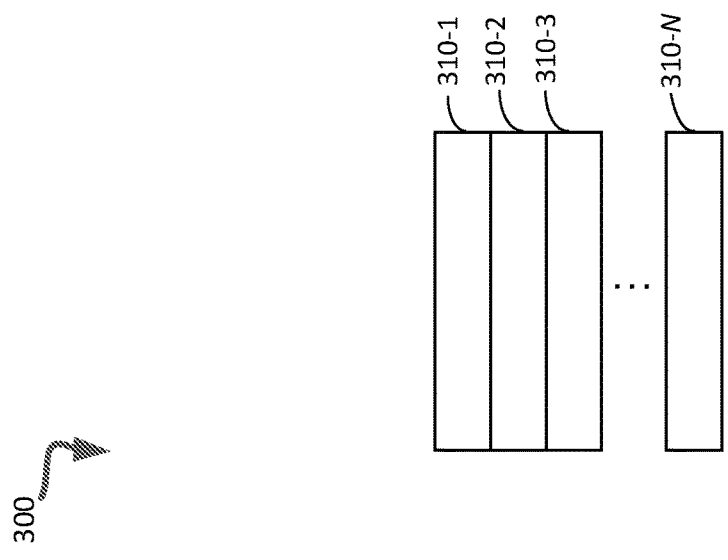
FIG. 3 is a block diagram of an example persistent memory region (PMR) in accordance with some embodiments of the present disclosure.

FIG. 3 is a block diagram of an example PMR region 300. For example, the PMR region 300 can be the PMR region 212 allocated to the volatile memory device 210 of FIG. 2. As shown, the PMR region 300 can maintain a number of pages. More specifically, the PMR region 300 can maintain N pages, including a first page 310-1, a second page 310-2, a third page 310-3 and an N-th page 310-N. Each of the pages 310-1 through 310-N can any suitable page size in accordance with the embodiments described herein. In some embodiments, the page size of each of the pages 310-1 through 310-N is 1 MB. Furthermore, the number of pages, N, can be any suitable number of pages in accordance with the embodiments described herein. The number pages that can be maintained by PMR region 300 can be a function of the size of the PMR region 300 and the page size. For example, if the size of the PMR region 300 is 32 MB and the page size is 1 MB, then the number of pages that can be maintained by the PMR region 300 is 32.

Referring back to FIG. 2, the system 200 further includes a non-volatile memory device 220 (e.g., memory device 130 of FIG. 1). For example, the non-volatile memory device can include a NAND device. A PMR region 222 (e.g., PMR region 137 of FIG. 1) is allocated to the memory device 220. Similar to the PMR region 212, the PMR region 222 has a small size relative to the non-volatile memory device 220. For example, if the memory device 220 includes a NAND having a size of 42 terabytes (TB), then the PMR region 222 can have a size of 10 GB. Similar to the PMR region 212, the PMR region 222 can include a number of pages each having a corresponding page size. For example, if the PMR region 222 has a size of 10 GB and each page of the PMR region 222 has a size of 1 MB, then the PMR region 222 can maintain 10,000 pages.

The system 200 further includes a PMR component 230. The PMR component 230 can be the same as the PMR component 113 of FIG. 1. The PMR component 230 can be embodied as firmware and/or hardware. The PMR component 230 is configured to manage the PMR region 212 by creating the PMR region 222 to be accessible through the PMR region 212. The operations of the PMR component 230 can be transparent to the host system (e.g., host system 110 of FIG. 1), such that the host system will see the full PMR region 222.

The PMR component 230 is further configured to implement caching logic to optimize access latency and hit rate to pages based on any suitable metric. One such data metric is "data temperature," which refers to whether data is "hot" or "cold" with respect to frequency of data access. Any suitable caching method can be implemented to determine which page(s) to swap out when a new page needs to be allocated in accordance with the embodiments described herein. Examples of suitable caching methods include, but are not limited to, first-in-first-out (FIFO), last-in-first-out (LIFO), least recently used (LRU), least frequently used (LFU), time aware LRU (TLRU), round robin (RR), etc.

To implement the caching logic, the system 200 can further include a set of registers internal to a controller 240 (e.g., the memory sub-system controller 115 of FIG. 1). More specifically, the set of registers can be used to manage when a page can be evicted (i.e., moved to non-volatile memory) or cached (i.e., moved into volatile memory). For example, the set of registers can include registers 241-245, where register 241, "pmr_nvm_size", indicates a size of the PMR region 222, register 242, "pmr_vm_size", indicates a size of the PMR region 212, register 243, "pmr_page_size", indicates a size of each page of the PMR region 212, register 244, "pmr_num_pages", indicates a number of pages of the PMR region 212, and register 245, "pmr_caching_control", controls the data caching by enabling the selection of a suitable caching method.

The set of registers can include additional registers not depicted in FIG. 2. For example, as will be described in further detail below with reference to FIG. 7, control registers called "pmr_sequential_write_threshold" and "pmr_sequential_read_threshold" can be defined to select a value to represent a high confidence of sequential access. As another example, as will be described in further detail below with reference to FIG. 7, actual metric registers "pmr_sequential_read_count" and "pmr_sequential_write_count" can be defined.

The caching logic can be used to perform a data operation (e.g., write and/or read) in response to receive a PMR access request to perform the data operation. More specifically, if access to a location in the PMR ("PMR access location") is page-resident ("hit"), then it can be possible to avoid invocation of the eviction process, and if the PMR access location is not page-resident ("miss"), then firmware can be invoked to manage the eviction process. To determine whether or not the PMR access location is a hit or miss, the system 200 can further include a cache lookup component 250. The cache lookup component 250 can maintain a cache lookup data structure (e.g., cache lookup table). In some embodiments, the cache lookup component 250 includes a content addressable memory (CAM) device. The cache lookup component 250 can generate metadata used to measure frequency of access (i.e., data temperature). Further details regarding performing the data operation using the caching mechanism will be described in further detail below with reference to FIG. 4.

The caching logic can be further used to manage shutdown and/or startup. More specifically, the caching logic can be used to manage shutdown in response to detecting a shutdown event, and the caching logic can be used to manage startup in response to detecting a startup event. Further details regarding managing shutdown and/or startup will be described in further detail below with reference to FIGS. 5 and 6.

The system 200 can be used to enable any suitable application(s). For example, the system 200 can be used to save metadata for a log structured file system. More specifically, the system 200 can be used by a logging application to claim the PMR region 222 as a log area. The logging application is unaware of the underlying complexity of the system 200, and the system 200 is unaware of the logging application (and other specific applications that can be enabled within the system 200). However, the system 200 can be designed to include components that are optimal for implementing the logging application.

The logging application can be write mostly. During writing, as soon as a page in the PMR region 212 is full, it can be evicted/written to PMR region 222. Write performance can be as fast as NVDIMM, and faster than logical block addressing (LBA). Since capacity exposed by the PMR exceeds the available memory of the PMR region 212 (e.g., 32 MB), reclaiming pages from the non-volatile memory device 220 can be slow, but logs are generally write-only and thus would not incur a penalty. Reads can be used during crash recovery, but that is a rather slow operation and performance is not critical. If a read is occurring, then it can be sequential so that the PMR region 212 can be populated with anticipated page requests. Metadata can coexist with data so the metadata can follow the data during failover. Further details regarding the logging application will be described in further detail below with reference to FIG. 7.

A number of considerations can be taken into account to ensure proper PMR operation and performance. One consideration is startup and shutdown. For example, since PMR is persistent, special startup and shutdown solutions can be provided to synchronize "state" with the host. The host may not be aware of things that are causing the PMR to not be "ready" or available, such as, e.g., power loss or memory degradation. Thus, a mechanism can be provided in accordance with the embodiments described herein to notify or communicate certain PMR state or readiness to the host. More specifically, a special status register can be defined that indicates "% readiness," where a scale of 0%-100% gives not only an indication of "not ready," but also a linear estimate of how long until "ready." Notification of this register changing state can be accomplished through Asynchronous Event Notification (AEN), which is mechanism defined as part of, e.g., the NVMe specification. The host application that uses PMR capability could thus observe a PMR readiness register at start-of-day and upon any AEN as a gate to any PMR operations or risk the loss of data. It is noted that time to boot and time to PMR readiness can be variable due to PMR size. To ensure integrity and synchronization with the host, a memory area hash can be used. For example, a host could keep its own hash and, upon 100% readiness, can be compared with a device version of the hash. The hash could also be stored in the storage (e.g., NAND) side of the system (e.g., SSD) (or even on another storage device). Time to PMR readiness or availability can be estimated based on the actions that need to be taken to get the PMR into a ready or available state.

Another consideration is AEN. AEN by itself does not directly communicate with applications that are making use of the PMR. Rather, the AEN generally notifies a storage driver that the memory happens to be attached to. Since the PMR application is not the storage driver, a thin driver in a storage stack on the host, which communicates with the PMR application, can be used to manage delivery of such events using the AEN mechanism (e.g., by employing a device mapper). More specifically, the thin driver can detect relevant AEN events that are relevant to the PMR and signal the relevant AEN events to the proper PMR driver.

Another consideration is degraded capability. For example, in the event of power loss, it can be important to have a mechanism that provides enough time to write any data that is not committed to non-volatile memory. For example, as described above with reference to FIG. 2, backup capacitors can be used to store energy to enable data writes in the event of power loss. In embodiments in which PMR is implemented as a power protected region on a volatile memory device (e.g., DRAM), PMR can rely on mechanisms such as, e.g., capacitors to enable data writes to non-volatile memory (e.g., NAND flash) in the event of power loss. However, a capacitor can degrade over time, and thus negatively affect the ability of the capacitor to provide data write support during a power loss event. To ensure proper PMR operation, periodic capacitor checks ("CAP checks") can be employed. Such CAP checks can validate that there is sufficient energy in the event of power loss, such that the device can have enough time to ensure data currently stored in volatile memory (e.g., DRAM) can be successfully written into non-volatile memory (e.g., NAND flash). Further details regarding such CAP checks will be described below with reference to FIG. 7.

Multiple levels or modes of operation can be defined to align with CAP conditions. For example, the modes can include a partially degraded PMR capacity reduced mode (i.e., the amount of PMR memory that is used can be reduced), and a read only mode (e.g., when the PMR can no longer be protected by the capacitor(s)). This event can be reported to the host through AEN and managed by the same thin driver above. Accordingly, AEN notification can enable the host to adjust the amount of memory being used, stop using the memory entirely, backup the memory, etc.

As mentioned above, there may be situations where there was some sort of degradation occurs and it becomes necessary to adjust the PMR size with the host. Examples of situations include, but are not limited to, capacitor degradation, non-volatile memory (e.g., NAND) capacity reduction, and volatile memory (e.g., DRAM) capacity reduction and/or high error rate that cannot be addressed using error-correcting code (ECC). To address such situations, a mechanism can be used to specify PMR size based on severity of situation. More specifically, the mechanism can include registers. For example, if the device has lost ability to reliably protect, e.g., 50% of the existing PMR, a PMR range that is to be read only (previously stored to non-volatile memory and still accessible) and another region that is still read/write capable can each be indicated. In a severe situation, the range may entirely be read-only or even "offline."

Another consideration is performance metric customization. For example, it can be useful in some instance to have PMR regions with customized performance metrics for different applications that have varying priorities. To achieve this, control registers can be defined along with a protocol agreement between host and device to enable regions (e.g., address ranges) together with the performance metrics. Examples of performance metrics include, but are not limited to, "maximum performance/throughput" (e.g., if a region as marked as maximum performance/throughput, sustained access is permitted to achieve maximum throughput) "lowest latency" (e.g., if a region is marked as lowest latency, the region can be prioritized upon access), "read only" (e.g., if a region is marked as read only, can ensure that data has been written to non-volatile memory (e.g., NAND flash) and not allow any writes), and "balanced performance."

Another consideration related to performance degradation are "dirty PMR lines" in which contents have changed since last refresh from non-volatile memory (e.g., NAND flash). Related to a degraded mode of operation where the ability to protect PMR is reduced, additional metadata associated with each PMR "line" can be employed that indicates whether the line is "dirty." If metadata indicates a "dirty PMR line," then the host has modified the contents in some way. A dirty PMR line can become a liability in the event of asynchronous power loss (APL). Operation of the PMR in degraded states can, however, be extended by keeping track of percent of the PMR lines that are "dirty" versus the time it would take to write "dirty" lines to NAND. For example, if there are 1,000 PMR lines that are managed, but only 500 can be taken care of, the number of outstanding dirty lines cannot exceed 500.

Figure 4:
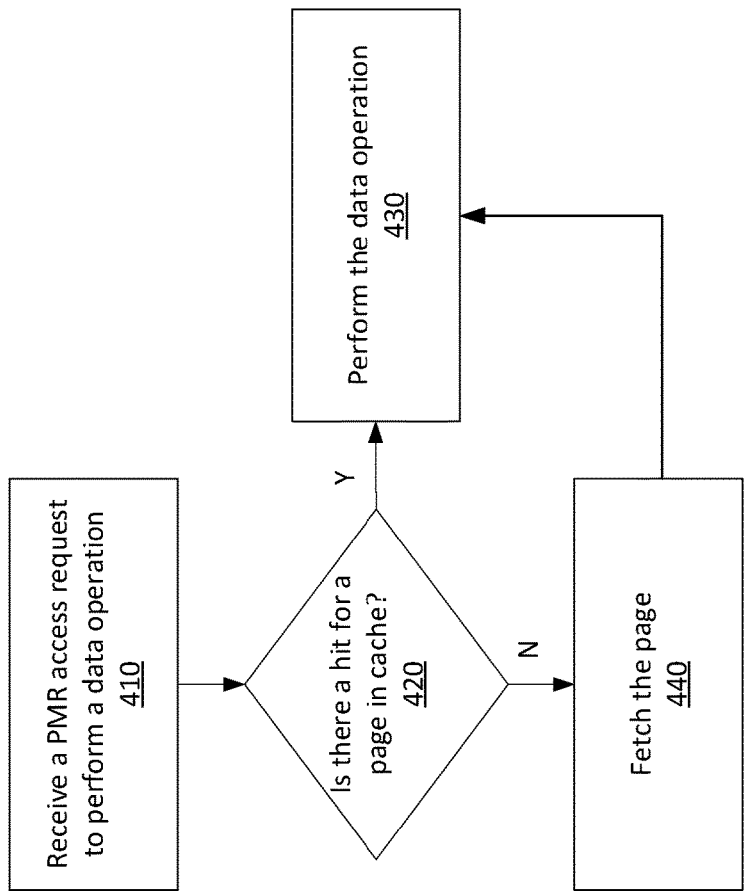
FIG. 4 is a flow diagram of an example method to manage persistent memory region (PMR) access to perform a data operation using a caching mechanism in accordance with some embodiments of the present disclosure.

FIG. 4 is a flow diagram of an example method 400 to manage persistent memory region (PMR) access to perform a data operation using a caching mechanism, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the PMR component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic receives a PMR access request to perform a data operation. For example, the PMR access request can be received from a host system (e.g., the host system 120 of FIG. 1). In some embodiments, the PMR access request is a PMR read access request. In some embodiments, the PMR access request is a PMR write access request.

At operation 420, the processing logic determines if there is a hit for a page in cache. If so, then the processing logic performs the data operation at operation 430. More specifically, the data operation can return data for a PMR read access request, or write data for a PMR write access request. The data write can write-through to non-volatile memory (e.g., NAND) if appropriate. If not, then the processing logic fetches the page at operation 440, and then proceeds to operation 430 to perform the data operation. In some embodiments, fetching the page at operation 440 includes evicting a page.

Figures 5, 6:
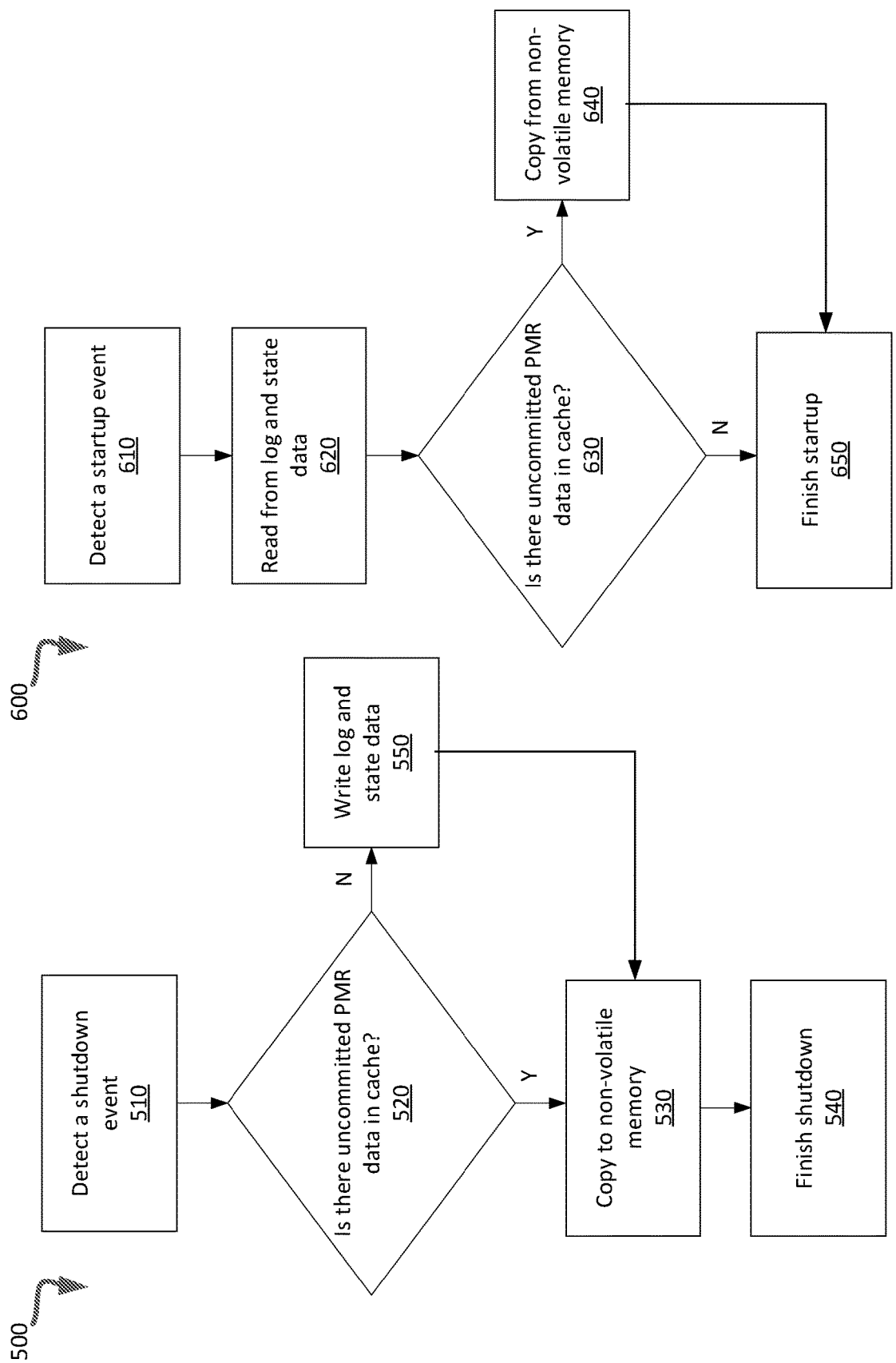
FIG. 5 is a flow diagram of an example method to manage a shutdown process associated with persistent memory region (PMR) using a caching mechanism in accordance with some embodiments of the present disclosure.
FIG. 6 is a flow diagram of an example method to manage a startup process associated with persistent memory region (PMR) using a caching mechanism in accordance with some embodiments of the present disclosure.

FIG. 5 is a flow diagram of an example method 500 to manage a shutdown process associated with persistent memory region (PMR) using a caching mechanism, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the PMR component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic detects a shutdown event. For example, detecting the shutdown event can include detecting a power loss signal or a shutdown signal.

At operation 520, it is determined if there is any uncommitted PMR data in cache. For example, it is determined if there are any "dirty" pages. If so, at operation 530, the processing logic copies the uncommitted PMR data to non-volatile memory to protect the data before losing power as a result of the shutdown event. In some embodiments, the non-volatile memory is NAND memory. Then, the processing logic finishes shutdown at operation 540.

If the processing logic does not determine that there is any cache data or PMR data, then the processing logic writes log and state data to non-volatile memory at operation 550. The data written at operation 550 should be sufficient to enable the state of the PMR (e.g., cache contents) to be restored as it was prior to the shutdown event. The process then proceeds to operation 530 to copy the log and state data to non-volatile memory and finish the shutdown at operation 540.

FIG. 6 is a flow diagram of an example method 600 to manage a startup process associated with persistent memory region (PMR) using a caching mechanism, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the PMR component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible At operation 610, the processing logic detects a startup event. For example, detecting the startup event can include detecting a power enable signal.

At operation 620, the processing logic reads from log and state data stored in non-volatile memory (e.g., NAND). More specifically, the log and state data is used to restore the state of the PMR system upon startup, which was written to non-volatile memory prior to a shutdown event or power failure (e.g., as described above in FIG. 5).

At operation 630, it is determined if there is any uncommitted PMR data in cache. If so, at operation 640, the processing logic copies the uncommitted PMR data from non-volatile memory (e.g., NAND). Then, the processing logic finishes startup at operation 650. If the processing logic does not determine that there is any uncommitted PMR data, then the processing logic proceeds to operation 650 to finish the startup operation.

Figure 7:
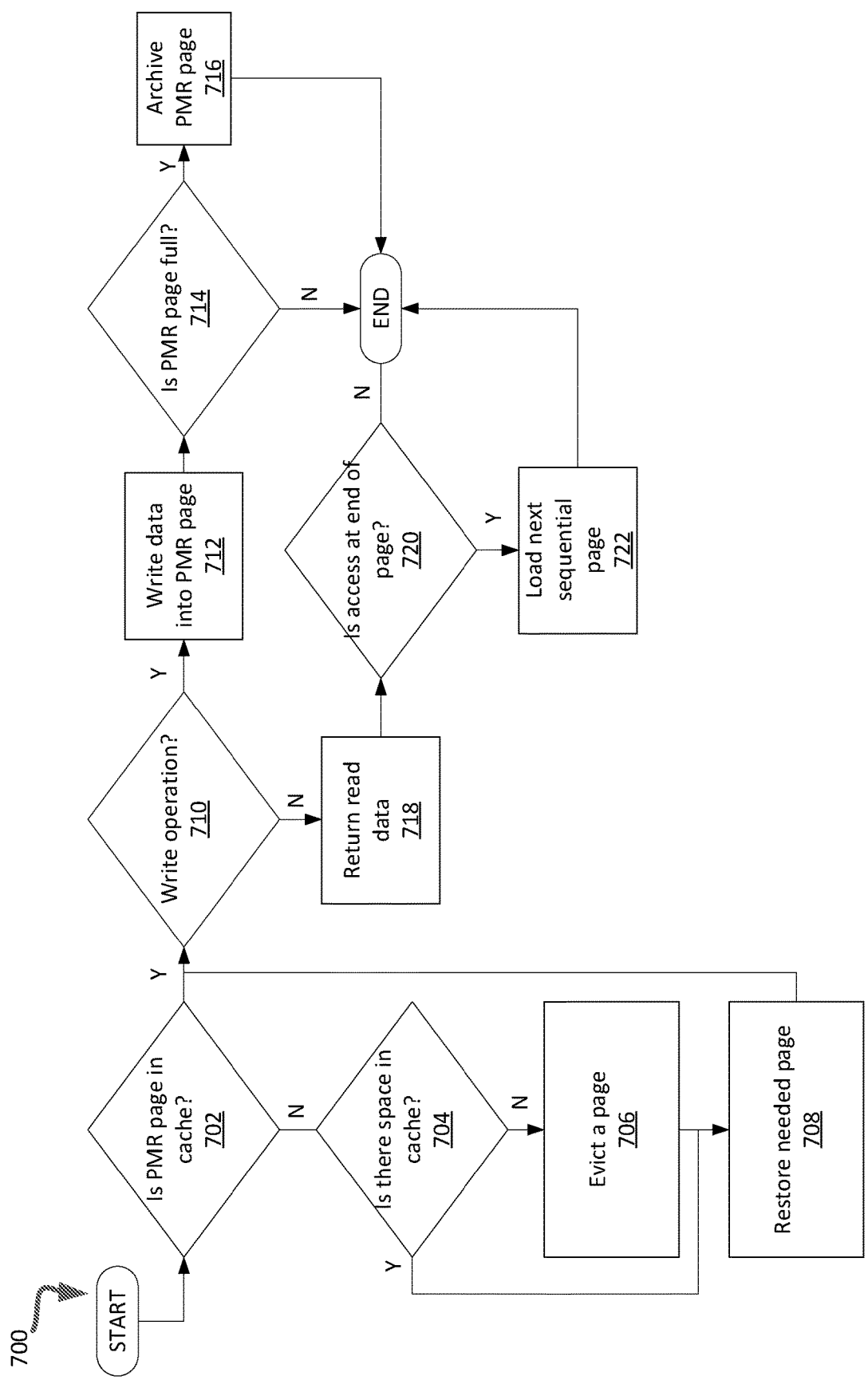
FIG. 7 is a flow diagram of an example method to implement a logging application using a system enabling an elastic persistent memory region (PMR) in accordance with some embodiments of the present disclosure.

FIG. 7 is a flow diagram of an example method 700 to implement a logging application operation using a system enabling an elastic persistent memory region (PMR) in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the PMR component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible At operation 702, the processing logic determines if there is a PMR page in cache. For a logging application, the page should be in the cache. If a PMR page is not determined to be in the cache, the processing logic determines if there is any space in the cache at operation 704. If not, the processing logic evicts a page at operation 706, and then restores a needed page at operation 708. If there is space in the cache, the process skips to restoring the needed page at operation 708.

If the processing logic determines if there is a PMR page in the cache at operation 702, or after the needed page is restored at operation 708, the processing logic determines if an access associated with a logging application operation is a write access at operation 710. If so, the processing logic writes data into a PMR page (in cache) at operation 712, and then determines if the PMR page is full at operation 714. If the access is a write sequential access, metrics can be updated accordingly. If not, the process ends. However, if the PMR page is full at operation 714, then the PMR page is archived at operation 716 prior to the process ending. Archiving the PMR page can include marking the PMR page as empty.

An example metric can be the last ten accesses have been writes to sequential addresses. As mentioned above with reference to FIG. 2, control registers called "pmr_sequential_write_threshold" and "pmr_sequential_read_threshold" can be defined to select a value would be selected (e.g., by firmware) to represent a high confidence of sequential access. Then, two additional registers can be defined that are the actual metric registers, "pmr_sequential_read_count" and "pmr_sequential_write_count." These registers can be incremented when a read access or a write access is sequential, respectively. If the read or write is not sequential (address+1), then the corresponding metric registers are cleared. Updating the metric registers can be done by hardware and/or firmware.

If the processing logic does not determine that the access associated with the logging application operation is a write access at operation 710, then the access is a read access and the processing logic returns read data at operation 718. If the access is a read sequential access, then metrics can be updated accordingly. The processing logic then determines if there is access at the end of a page at operation 720. If not, the process ends. However, if there is access at the end of the page, the processing logic loads a next sequential page at operation 722 prior to the logging application operation terminating. That is, if the read access is sequential, the cache can be pre-populated in anticipation of future sequential read accesses.

Figure 8:
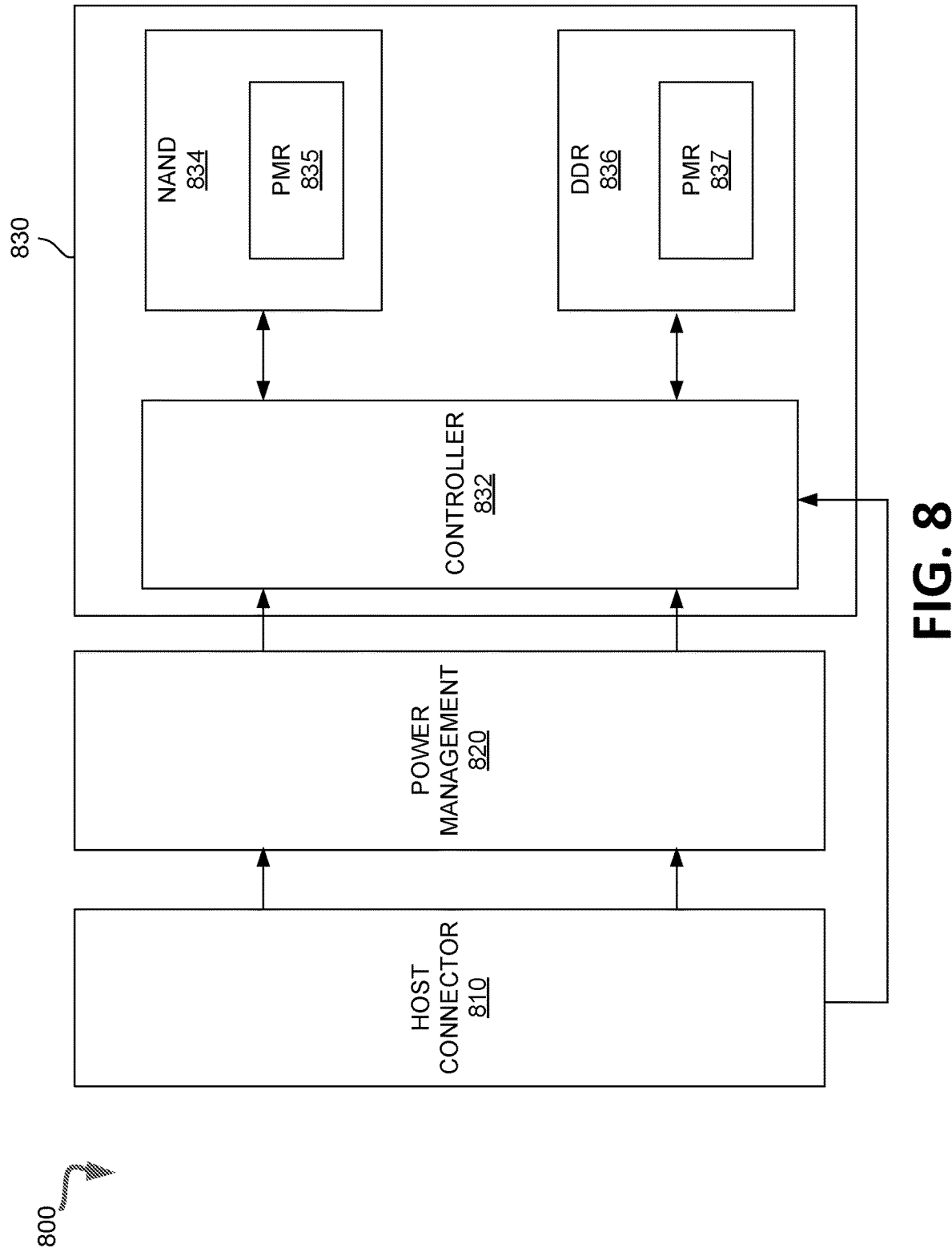
FIG. 8 is a block diagram illustrating a system for implementing a capacitor (CAP) check in accordance with some embodiments of the present invention.

FIG. 8 illustrates an example power system 800, in accordance with some embodiments of the present disclosure. As shown, the power system 800 includes a host connector component 810, a power management component 820, and a sub-system component 830, such as the sub-system 110 of FIG. 1, enabled with an elastic persistent memory region (PMR). In some embodiments, the sub-system component 830 includes an NVMe SSD device, and the host connector component 810 is an NVMe host connector.

The power management component 820 is associated with a storage voltage (Vstrg) and can include a power management integrated circuit (PMIC) sub-component and an inrush/backup sub-component. The sub-system component 830 can include a controller component 832 (e.g., an application-specific integrated circuit (ASIC) controller). The power management component 820 can be operatively coupled with the controller component 832 via, e.g., an Inter-Integrated Circuit (I²C) protocol. The sub-system component 830 can further include a NAND 834 and a DDR 836. A PMR region 835 is allocated to the NAND 834 and a PMR region 837 is allocated to the DDR. The controller component 832 is operatively coupled to the NAND 834 and the DDR 836.

In this example, the PMR region 837 is a power protected region protected by energy released by a capacitor. The components 810-830 can communicate with each other to enable a capacitor (CAP) check or test to ensure proper operation of the PMR 837. More specifically, the controller component 832 can periodically communicate with the power management component 820 to trigger the CAP check, receive results of the CAP check, and determine availability or status of the PMR 837 based on the results. For example, during the CAP check a capacitor can be discharged through an external resistor from a first pin connected to the capacitor for energy storage and release, to a second pin for connecting the external resistor for the CAP test. A transistor (e.g., field-effect transistor (FET)) can be connected to the second pin and a third pin connected to ground. When a start CAP test register bit is set (e.g., via an I²C interface), the second pin can be connected to ground through the transistor for energy discharge. More specifically, power can be stopped at an initial time, at which the capacitor can begin discharging from an initial voltage and an internal timer begins to count. The internal timer can keep counting until the storage voltage hits a threshold at an end time at which the internal timer can stop counting and an end voltage can be measured. Accordingly, the discharge time can be measured as the difference between the initial time and the end time, and the voltage discharge can be measured as the difference between the initial voltage and the end voltage.

Figure 9:
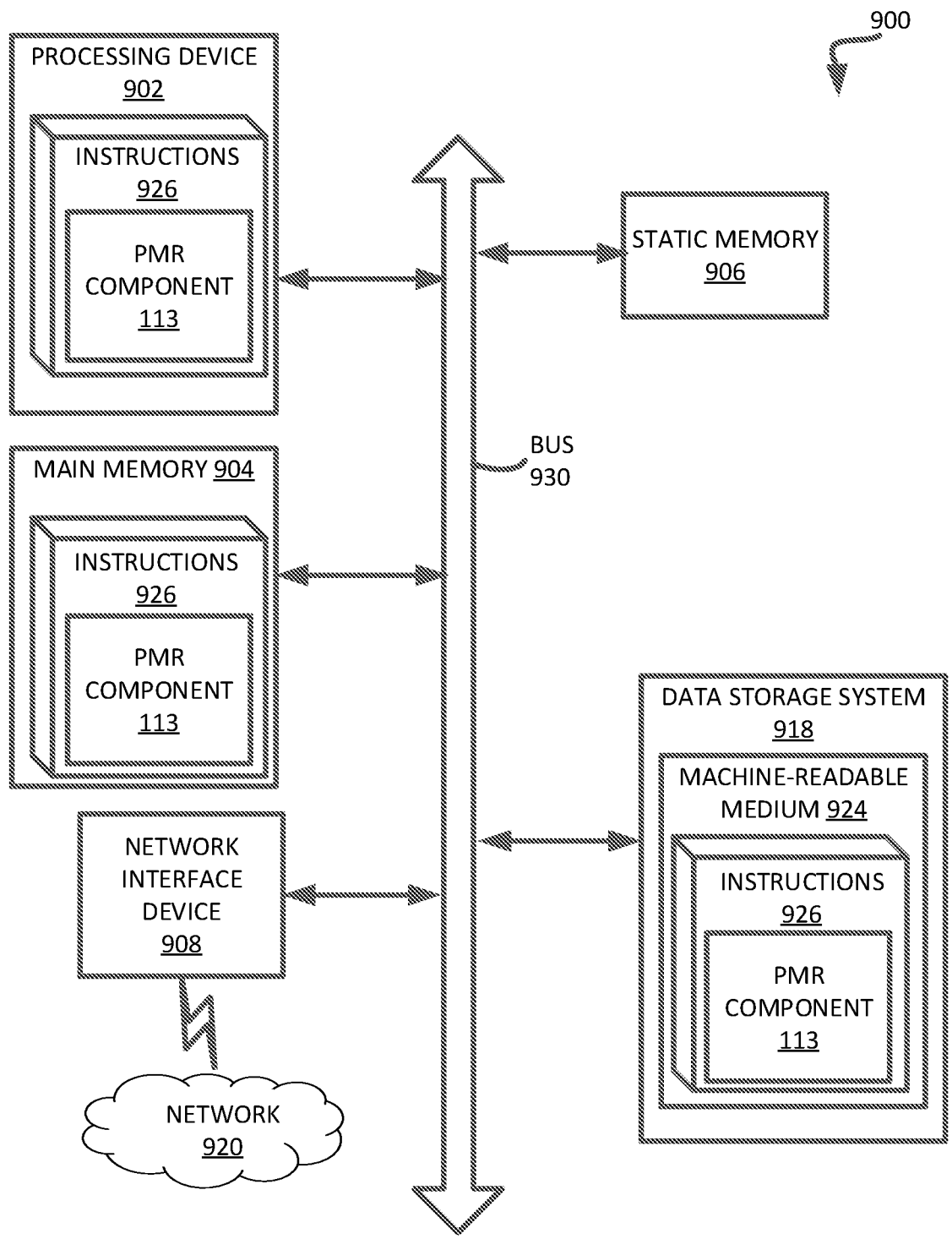
FIG. 9 is a block diagram of an example computer system in which embodiments of the present disclosure can operate.

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the PMR component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or RDRAM, etc.), a static memory 906 (e.g., flash memory, static random access memory (SRAM), etc.), and a data storage system 918, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 602 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable medium) on which is stored one or more sets of instructions 626 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory sub-system 110 of FIG. 1.

In one embodiment, the instructions 926 include instructions to implement functionality corresponding to a VC component (e.g., the PMR component 113 of FIG. 1). While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a volatile memory device having a power protected region allocated as a first persistent memory region (PMR) having a first set of pages, wherein the power protected region utilizes a mechanism to, in an event of power loss, provide power to enable writes of data from the volatile memory device to non-volatile memory;
   a non-volatile memory device having a region allocated as a second PMR having a second set of pages; and
   at least one processing device, operatively coupled to the volatile memory device and the non-volatile memory device, to perform operations comprising:
   causing the second PMR to be accessible through the first PMR.

2. The system of claim 1, wherein the volatile memory device includes a DDR device.

3. The system of claim 1, further comprising a set of key registers internal to a controller, wherein the operations further comprise managing PMR caching using a caching mechanism that manages page eviction based on the set of key registers.

4. The system of claim 3, wherein the set of key registers comprises at least one: a key register indicating a size of the first PMR, a key register indicating a size of the second PMR, a key register indicating a size of each page of the first PMR, a key register indicating a number of pages of the first PMR, or a key register controlling restoration and eviction of PMR data.

5. The system of claim 3, wherein the operations further comprise:
   receiving a PMR access request to perform a data operation; and
   performing the data operation using the caching mechanism.

6. The system of claim 3, wherein the operations further comprise managing at least one of shutdown or startup using the caching mechanism.

7. A method comprising:
   receiving, by a processing device, an access request associated with a logging application operation, wherein the processing device is operatively coupled to a volatile memory device having a power protected region allocated as a first persistent memory region (PMR) having a first set of pages and a non-volatile memory device having a region allocated as a second PMR having a second set of pages, wherein the power protected region utilizes a mechanism to, in an event of power loss, provide power to enable writes of data from the volatile memory device to non-volatile memory;
   determining, by the processing device, whether the access request comprises a write access request; and
   in response to determining that the access request comprises a write access request, writing, by the processing device, data in a PMR page in satisfaction of the write access request.

8. The method of claim 7, further comprising determining, by the processing device, that the PMR page is in cache prior to determining whether the access request comprises a write access request.

9. The method of claim 7, further comprising:
determining, by the processing device, that the PMR page is not in cache; and
after determining that the PMR page is not in cache, restoring, by the processing device, a needed page prior to determining that the access request comprises a write access request.

10. The method of claim 7, further comprising:
in response to writing the data in the PMR page, determining, by the processing device, that the PMR page is full;
archiving, by the processing device, the PMR page; and
terminating, by the processing device, the logging application operation.

11. The method of claim 7, further comprising:
in response to writing the data in the PMR page, determining, by the processing device, that the PMR page is not full; and
terminating, by the processing device, the logging application operation.

12. The method of claim 7, wherein writing the data further comprises updating metrics.

13. A non-transitory computer-readable storage medium comprising instructions that, when executed by a processing device, cause the processing device to perform operations comprising:
receiving an access request associated with a logging application operation, wherein the processing device is operatively coupled to a volatile memory device having a power protected region allocated as a first persistent memory region (PMR) having a first set of pages and a non-volatile memory device having a region allocated as a second PMR having a second set of pages, wherein the power protected region utilizes a mechanism to, in an event of power loss, provide power to enable writes of data from the volatile memory device to non-volatile memory;
determining whether the access request comprises a read access request; and
in response to determining that the access request comprises a read access request, returning read data in satisfaction of the read access request.

14. The non-transitory computer-readable storage medium of claim 13, wherein the operations further comprise determining that a PMR page is in cache prior to determining whether the access request comprises a read access request.

15. The non-transitory computer-readable storage medium of claim 13, wherein the operations further comprise:
determining that a PMR page is not in cache; and
after determining that the PMR page is not in cache, restoring a needed page prior to determining that the access request comprises a read access request.

16. The non-transitory computer-readable storage medium of claim 13, wherein the operations further comprise:
in response to returning the read data, determining that read access is at an end of a PMR page;
in response to determining that read access is at an end of the PMR page, loading a next sequential page; and
terminating the logging application operation.

17. The non-transitory computer-readable storage medium of claim 13, wherein the operations further comprise:
in response to returning the read data, determining that read access is not at an end of a PMR page; and
terminating the logging application operation.

18. The non-transitory computer-readable storage medium of claim 13, wherein returning the read data further comprises updating metrics.

* * * * *